(12) United States Patent
Takemoto

(10) Patent No.: US 11,095,122 B2
(45) Date of Patent: Aug. 17, 2021

(54) DC-DC CONVERTER CONTROL APPARATUS AND DC-DC CONVERTER CONTROL METHOD

(71) Applicant: TOYOTA JIDOSHA KABUSHIKI KAISHA, Toyota (JP)

(72) Inventor: Taiki Takemoto, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/887,553

(22) Filed: May 29, 2020

(65) Prior Publication Data

US 2021/0006066 A1  Jan. 7, 2021

(30) Foreign Application Priority Data

Jul. 5, 2019  (JP) .............................. JP2019-125967

(51) Int. Cl.
| | |
|---|---|
| *H02J 1/10* | (2006.01) |
| *B60S 1/08* | (2006.01) |
| *H02M 1/00* | (2006.01) |
| *H02M 3/158* | (2006.01) |
| *B60L 1/00* | (2006.01) |
| *B60L 58/20* | (2019.01) |

(52) U.S. Cl.
CPC ............... *H02J 1/102* (2013.01); *B60L 1/00* (2013.01); *B60L 58/20* (2019.02); *B60S 1/08* (2013.01); *H02M 1/00* (2013.01); *H02M 3/1584* (2013.01); *B60L 2210/10* (2013.01); *H02J 2310/48* (2020.01)

(58) Field of Classification Search
CPC .... B60L 2210/12; B60L 1/00; B60L 2210/10; B60L 58/20; H02J 1/102; H02J 1/10; H02J 2310/48; H02M 3/1584
See application file for complete search history.

(56) References Cited

U.S. PATENT DOCUMENTS

| | | | |
|---|---|---|---|
| 10,017,058 B2 * | 7/2018 | Nomura | .................... B60L 1/02 |
| 10,840,729 B2 * | 11/2020 | Haefele | .................. B60R 16/03 |
| 2011/0193410 A1 | 8/2011 | Glohr et al. | |
| 2013/0099559 A1 | 4/2013 | Machi et al. | |
| 2016/0072293 A1 | 3/2016 | Jouper | |
| 2018/0262018 A1 * | 9/2018 | Satoh | ..................... H02J 7/042 |

FOREIGN PATENT DOCUMENTS

JP     5387651 B2    1/2014

\* cited by examiner

*Primary Examiner* — Ryan Johnson
(74) *Attorney, Agent, or Firm* — Oliff PLC

(57) ABSTRACT

A DC-DC converter control apparatus, installed in a vehicle including parallel-connected first and second DC-DC converters and in-vehicle devices configured to operate on an electric power that is output from at least one of the first and second DC-DC converters, is configured to control the first and second DC-DC converters, and includes a processor. The processor is programmed to monitor an operational status of at least one predetermined device that is included in the in-vehicle devices; when the at least one predetermined device is not in operation, set at least a controlled target value of an output voltage of the first DC-DC converter to a target voltage for operating the in-vehicle devices; and, when at least one of the at least one predetermined device is in operation, set controlled target values of output voltages of both the first and second DC-DC converters to the target voltage.

11 Claims, 2 Drawing Sheets

DC-DC CONVERTER CONTROL APPARATUS AND DC-DC CONVERTER CONTROL METHOD

INCORPORATION BY REFERENCE

The disclosure of Japanese Patent Application No. 2019-125967 filed on Jul. 5, 2019 including the specification, drawings and abstract is incorporated herein by reference in its entirety.

BACKGROUND

1. Technical Field

The disclosure relates to a DC-DC converter control apparatus mounted on a vehicle, and a DC-DC converter control method.

2. Description of Related Art

In recent years, to address an increased electric power demand resulting from an increased number of in-vehicle devices, power supply systems in which a first DC-DC converter and a second DC-DC converter are connected in parallel with each other have been suggested. For example, Japanese Patent No. 5387651 describes a power supply system that supplies an electric power to in-vehicle devices by appropriately switching and operating two parallel-connected DC-DC converters.

SUMMARY

In the power supply system of Japanese Patent No. 5387651, when an excess of electric power demand over supply capacity occurs in in-vehicle devices while an electric power is being supplied with a first DC-DC converter, a second DC-DC converter is started up and starts supplying an electric power. However, there is a time lag from when an instruction to start up the second DC-DC converter is issued to when the second DC-DC converter actually starts supplying an electric power to the in-vehicle devices, so it is conceivable that the output voltage of the DC-DC converters temporarily drops during then. This temporary output voltage drop affects the operations of a predetermined device, and there are concerns that an occupant, or the like, in a vehicle may have a sense of strangeness, a sense of anxiety, a sense of distrust, or the like.

However, sufficient consideration has not been made so far on measures for a predetermined device against such a temporary output voltage drop of DC-DC converters.

The disclosure provides a DC-DC converter control apparatus and a DC-DC converter control method that are able to reduce the occurrence of a temporary output voltage drop of DC-DC converters, which affects the operation of a predetermined device.

A first aspect of the disclosure relates to a DC-DC converter control apparatus, installed in a vehicle. The vehicle includes a first DC-DC converter, a second DC-DC converter connected in parallel with the first DC-DC converter, and a plurality of in-vehicle devices configured to operate on an electric power that is output from at least one of the first and second DC-DC converters. The DC-DC converter control apparatus is configured to control the first and second DC-DC converters. The DC-DC converter control apparatus includes a processor. The processor is programmed to monitor whether at least one predetermined device is in operation or not. The at least one predetermined device is included in the plurality of in-vehicle devices. The processor is programmed to, when the at least one predetermined device is not in operation, set at least a controlled target value of an output voltage of the first DC-DC converter to a target voltage for operating the plurality of in-vehicle devices; and, when at least one of the at least one predetermined device is in operation, set the controlled target value of the output voltage of the first DC-DC converter and a controlled target value of an output voltage of the second DC-DC converter to the target voltage.

According to the above aspect, during operation of the at least one predetermined device, an electric power can be supplied from both the first DC-DC converter and the second DC-DC converter. Thus, even when an excess of electric power demand over a supply capacity of the first DC-DC converter occurs in the plurality of in-vehicle devices, the occurrence of a temporary output voltage drop of the DC-DC converters, which affects the operation of the at least one predetermined device, is reduced.

In the apparatus according to the first aspect, the processor may be programmed to, when the at least one predetermined device is not in operation, when a total amount of electric power required from the plurality of in-vehicle devices is less than or equal to an available amount of electric power of the first DC-DC converter, set the controlled target value of the output voltage of the second DC-DC converter to a voltage lower than the target voltage; and when the total amount of electric power required from the plurality of in-vehicle devices exceeds the available amount of electric power of the first DC-DC converter, set the controlled target value of the output voltage of the second DC-DC converter to the target voltage.

In the above aspect, the processor may be programmed to, when an instruction value for controlling the output voltage of the first DC-DC converter reaches an allowable prescribed upper limit, determine that the total amount of electric power required from the plurality of in-vehicle devices exceeds the available amount of electric power of the first DC-DC converter.

In the above aspect, the processor may be programmed to, after a transition from a state where the at least one of the at least one predetermined device is in operation to a state where the at least one predetermined device is not in operation, set the controlled target value of the output voltage of the second DC-DC converter to the target voltage during a predetermined period.

In the above aspect, the target voltage may be a reference voltage for operating the plurality of in-vehicle devices normally.

In the above aspect, the processor may be programmed to output a first instruction value to the first DC-DC converter; the processor may be programmed to set the controlled target value of the output voltage of the first DC-DC converter; the processor may be programmed to output a second instruction value to the second DC-DC converter; and the processor may be programmed to set the controlled target value of the output voltage of the second DC-DC converter.

In the above aspect, the at least one predetermined device may be an illuminating device or a wiper device.

A second aspect of the disclosure relates to a DC-DC converter control method for a vehicle. The vehicle includes a first DC-DC converter, a second DC-DC converter connected in parallel with the first DC-DC converter; and a plurality of in-vehicle devices configured to operate on an electric power that is output from at least one of the first and second DC-DC converters. The DC-DC converter control method includes monitoring whether at least one predetermined device is in operation or not. The at least one predetermined device is included in the plurality of in-vehicle devices. The DC-DC converter control method further includes determining whether the at least one predetermined device is in operation; when it is determined that the at least one predetermined device is not in operation, setting at least a controlled target value of an output voltage of the first DC-DC converter to a target voltage for operating the plurality of in-vehicle devices; and, when it is determined that at least one of the at least one predetermined device is in operation, setting the controlled target value of the output voltage of the first DC-DC converter and a controlled target value of an output voltage of the second DC-DC converter to the target voltage.

In the second aspect, the method may further includes, when it is determined that the at least one predetermined device is not in operation, determining whether a total amount of electric power required from the plurality of in-vehicle devices is less than or equal to an available amount of electric power of the first DC-DC converter; when it is determined that the total amount of electric power required from the plurality of in-vehicle devices is less than or equal to the available amount of electric power of the first DC-DC converter, setting the controlled target value of the output voltage of the second DC-DC converter to a voltage lower than the target voltage; and when it is determined that the total amount of electric power required from the plurality of in-vehicle devices exceeds the available amount of electric power of the first DC-DC converter, setting the controlled target value of the output voltage of the second DC-DC converter to the target voltage.

In the second aspect, when an instruction value for controlling the output voltage of the first DC-DC converter reaches an allowable prescribed upper limit, it may be determined that the total amount of electric power required from the plurality of in-vehicle devices exceeds the available amount of electric power of the first DC-DC converter.

In the second aspect, the method may further includes, after a transition from a state where the at least one of the at least one predetermined device is in operation to a state where the at least one predetermined device is not in operation, setting the controlled target value of the output voltage of the second DC-DC converter to the target voltage during a predetermined period.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A DC-DC converter control apparatus according to embodiments of the disclosure is configured to, when at least one predetermined device is in operation in a power supply system in which two DC-DC converters are connected in parallel with each other, constantly keep both the DC-DC converters operable. With this configuration, when an excess of electric power demand over a supply capacity of one of the DC-DC converters occurs, a time lag that is taken until the other one of the DC-DC converters starts up is reduced as compared to when one of the DC-DC converters and the other one of the DC-DC converters are sequentially operated. Thus, the occurrence of a temporary output voltage drop of the DC-DC converters, which affects the operation of the at least one predetermined device, is reduced.

Hereinafter, an embodiment of the disclosure will be described in detail with reference to the accompanying drawings.

Configuration

Figure 1:
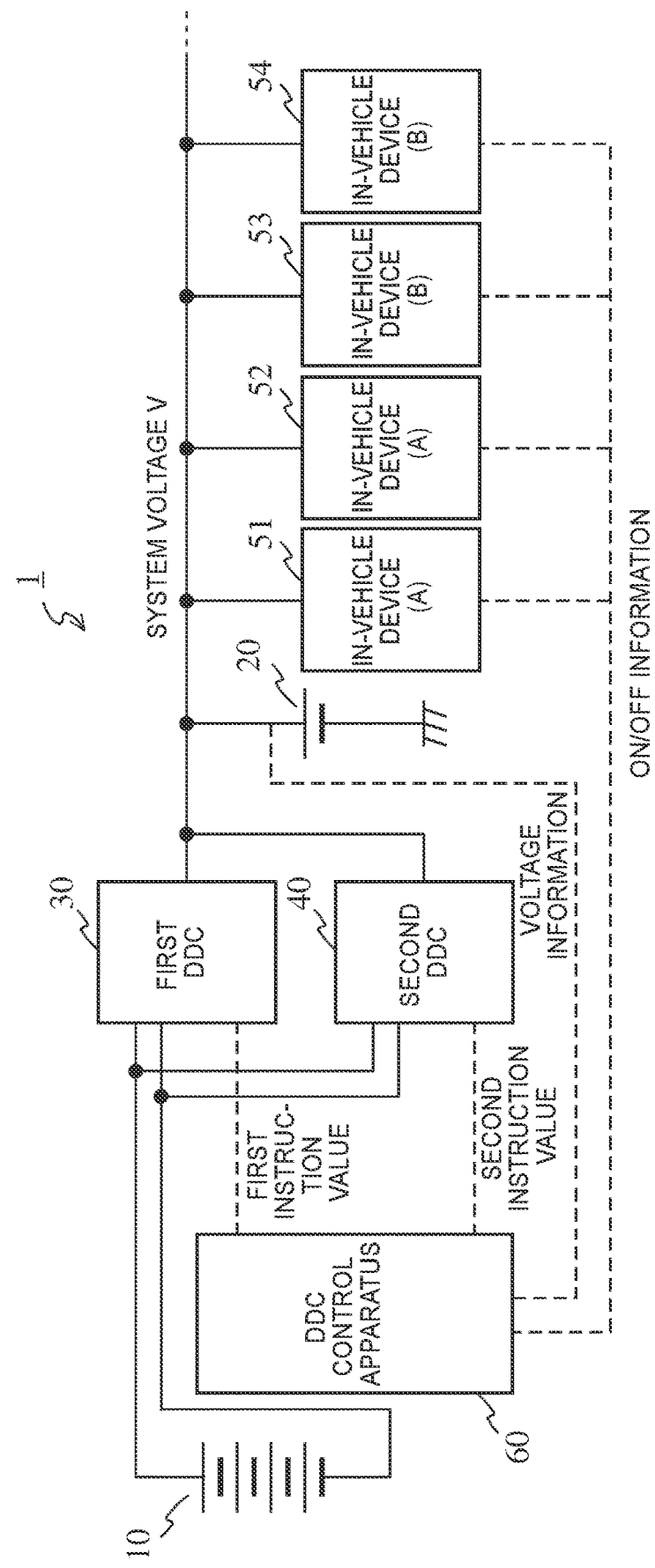
FIG. 1 is a schematic configuration diagram of a power supply system including a DC-DC converter control apparatus according to an embodiment.

FIG. 1 is a block diagram that shows the schematic configuration of a power supply system 1 including a DC-DC converter control apparatus according to the embodiment of the disclosure. The power supply system 1 illustrated in FIG. 1 includes a first battery 10, a second battery 20, a first DC-DC converter (DDC) 30, a second DC-DC converter (DDC) 40, a plurality of in-vehicle devices 51, 52, 53, 54, and the DDC control apparatus 60 of the present embodiment. In FIG. 1, electric power lines are represented by continuous lines, and control signal lines, and other lines, other than the electric power lines, are represented by the dashed lines. A hybrid vehicle (HV) or an electric vehicle (EV) may be illustrated as a vehicle in which the power supply system 1 is installed.

The first battery 10 is a chargeable and dischargeable secondary battery, such as a lithium ion battery, and is a drive battery mounted on a vehicle as, for example, a high-voltage power supply source. The first battery 10 is connected to the in-vehicle devices 51, 52, 53, 54 via the first DC-DC converter 30 and the second DC-DC converter 40 such that electric power can be supplied.

The second battery 20 is a chargeable and dischargeable secondary battery, such as a lead storage battery, and is an auxiliary battery mounted on the vehicle as, for example, a low-voltage power supply source. The second battery 20 is connected to the in-vehicle devices 51, 52, 53, 54 such that electric power can be supplied.

The first DC-DC converter 30 connects the first battery 10 with the second battery 20 and the in-vehicle devices 51, 52, 53, 54. The first DC-DC converter 30 supplies the electric power of the first battery 10 to the second battery 20 and the in-vehicle devices 51, 52, 53, 54. When an electric power is supplied, the first DC-DC converter 30 is able to convert the voltage of the first battery 10, which is an input voltage, to a predetermined value based on a first instruction value (described later) that is provided from the DDC control apparatus 60 and output the converted voltage to an output end.

The second DC-DC converter 40 is connected in parallel with the first DC-DC converter 30. The second DC-DC converter 40 supplies the electric power of the first battery 10 to the second battery 20 and the in-vehicle devices 51, 52, 53, 54. When an electric power is supplied, the second DC-DC converter 40 is able to convert the voltage of the first battery 10, which is an input voltage, to a predetermined value based on a second instruction value (described later) that is provided from the DDC control apparatus 60 and output the converted voltage to an output end.

The first DC-DC converter 30 and the second DC-DC converter 40 may have different outputtable current-carrying capacities or may have the same outputtable current-carrying capacity as long as a maximum electric power demand (consumption current) that occurs in the in-vehicle devices 51, 52, 53, 54 can be satisfied with both the first DC-DC converter 30 and the second DC-DC converter 40. In the present embodiment, the configuration that the first DC-DC converter 30 and the second DC-DC converter 40 are connected in parallel with each other is described. Alternatively, the configuration that three or more DC-DC converters are connected in parallel with one another may be employed. DDC control (described later) can be appropriately executed.

The in-vehicle devices 51, 52, 53, 54 are devices mounted on the vehicle, and operate on the electric power that is supplied from the first battery 10 via at least one of the first DC-DC converter 30 and the second DC-DC converter 40 or the electric power of the second battery 20. The in-vehicle devices 51, 52, 53, 54 each are classified into any one of devices A and devices B that will be described below in the present embodiment. The voltage of electric power that is supplied to the in-vehicle devices 51, 52, 53, 54, that is, the terminal voltage of the second battery 20, is hereinafter referred to as "system voltage V".

The devices A are in-vehicle devices that, when the system voltage V temporarily drops to a predetermined voltage, there are concerns that an occupant, or the like, in the vehicle may have a sense of strangeness, a sense of anxiety, a sense of distrust, or the like, because of the operation of a device(s) under the influence of a voltage drop. An illuminating device, a wiper device, and the like, may be illustrated as the devices A. An illuminating device may develop a phenomenon that the brightness of an illuminating lamp instantaneously decreases because of a temporary drop of the system voltage V. A wiper device may develop a phenomenon that the operational speed of a wiper instantaneously decreases because of a temporal decrease in the system voltage V. These phenomena do not impair the safe operation of the vehicle but an occupant, or the like, may presumably have a sense of strangeness, a sense of anxiety, a sense of distrust, or the like. In the present embodiment, the in-vehicle devices 51, 52 are classified as the devices A.

The devices B are in-vehicle devices other than the devices A. In other words, the devices B are in-vehicle devices from which an occupant, or the like, in the vehicle does not have a sense of strangeness, a sense of anxiety, a sense of distrust, or the like, from their operations even under the influence of a temporary drop of the system voltage V or in-vehicle devices that are insusceptible to a temporary drop of the system voltage V. In the present embodiment, the in-vehicle devices 53, 54 are classified as the devices B.

In the present embodiment, the configuration including the four in-vehicle devices 51, 52, 53, 54 made up of the two devices A and the two devices B is illustrated; however, the number of in-vehicle devices is not limited thereto. As long as the configuration includes a plurality of in-vehicle devices made up of at least one device A and at least one device B, the first DC-DC converter 30 and the second DC-DC converter 40 can be appropriately controlled by the DDC control apparatus 60 (described later).

The DDC control apparatus 60 controls the operation of each of the first DC-DC converter 30 and the second DC-DC converter 40 based on predetermined information that is acquired from each of the in-vehicle devices 51, 52, 53, 54 and the second battery 20. More specifically, the DDC control apparatus 60 controls the first DC-DC converter 30 by providing the first DC-DC converter 30 with the first instruction value for setting a controlled target value of the output voltage to a predetermined target voltage Vtgt. The target voltage Vtgt may be, for example, a reference voltage for operating the in-vehicle devices 51, 52, 53, 54 normally.

The DDC control apparatus 60 controls the second DC-DC converter 40 by providing the second DC-DC converter 40 with the second instruction value for setting a controlled target value of the output voltage to a voltage based on an electric power demand from the in-vehicle devices 51, 52, 53, 54.

The predetermined information that the DDC control apparatus 60 acquires from each of the in-vehicle devices 51, 52, 53, 54 may be on/off information that indicates whether the device is in operation (on state) or not in operation (off state). The DDC control apparatus 60 monitors the operational statuses of the in-vehicle devices 51, 52, 53, 54 by using the on/off information. The predetermined information that the DDC control apparatus 60 acquires from the second battery 20 may be information about the terminal voltage of the second battery 20. The DDC control apparatus 60 monitors the status of the system voltage V by using the voltage information. The DDC control apparatus 60 does not need to acquire all the pieces of on/off information from the in-vehicle devices 51, 52, 53, 54 and may acquire the pieces of on/off information from only the devices A (in-vehicle devices 51, 52). The predetermined information may be communicated through an in-vehicle network, such as a controller area network (CAN), or may be communicated through an exclusive signal line.

The DDC control apparatus 60 can be typically made up of an electronic control unit (ECU) including a processor, a memory, an input/output interface, and the like. The DDC control apparatus 60 may include part or all of the ECUs installed in the vehicle, including an ECU that is able to control the output voltages of the first DC-DC converter 30 and second DC-DC converter 40.

Control

Figure 2:
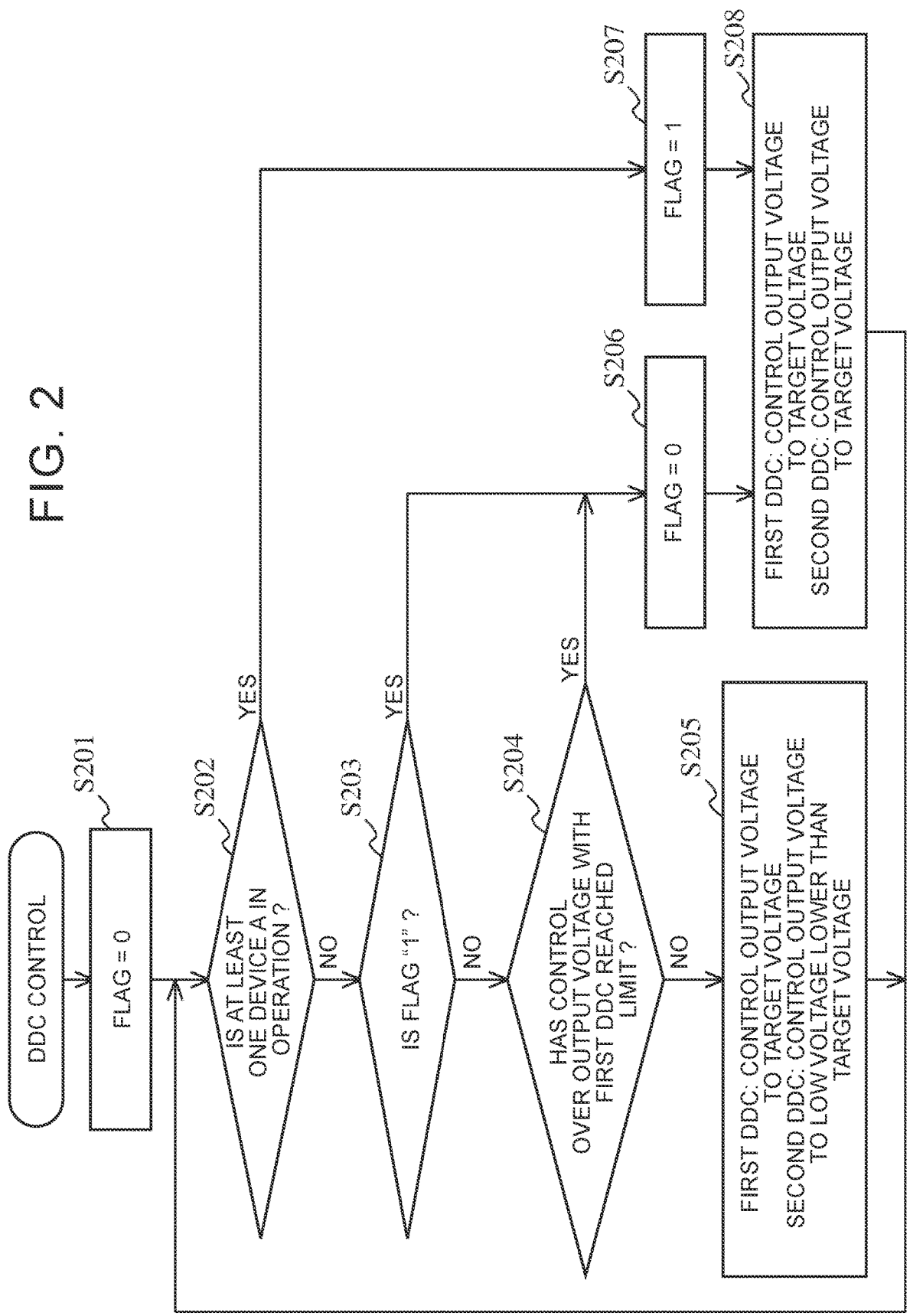
FIG. 2 is a control flowchart that the DC-DC converter control apparatus executes.

Control that the DDC control apparatus 60 according to the present embodiment executes will be described with further reference to FIG. 2. FIG. 2 is a flowchart that shows the procedure of DC-DC converter control (DDC control) that the DDC control apparatus 60 executes.

The DDC control shown in FIG. 2 is started, for example, when the power supply system 1 of the vehicle starts up, and is repeatedly executed until the power supply system 1 shuts down. After startup of the power supply system 1, the DDC control apparatus 60 starts control by providing the first DC-DC converter 30 with the first instruction value for setting the controlled target value of the output voltage to the target voltage Vtgt.

In step S201, the DDC control apparatus 60 sets a predetermined flag to "0". This flag is used to determine the timing of a change from a state (flag=1) where at least one of the devices A (in-vehicle devices 51, 52) is in operation to a state (flag=0) where any of the devices A is not in operation.

In step S202, the DDC control apparatus 60 determines whether at least one of the devices A (in-vehicle devices 51, 52) is in operation. When at least one of the devices A is in operation (Yes in step S202), the process proceeds to step S207; otherwise (No in step S202), the process proceeds to step S203.

In step S203, the DDC control apparatus 60 determines whether the flag is "1". When the flag is "1" (Yes in step S203), the process proceeds to step S206; otherwise (No in step S203), the process proceeds to step S204.

In step S204, the DDC control apparatus 60 determines whether control over the output voltage with the first DC-DC converter 30 has reached a limit. Specifically, the DDC control apparatus 60 determines whether the first DC-DC converter 30 is in a state where the output voltage of the first DC-DC converter 30 does not increase to the target voltage Vtgt that is the controlled target value even when the first DC-DC converter 30 is controlled with the first instruction value set to an allowable upper limit. Such a state of the first DC-DC converter 30 occurs as a result of the fact that the total amount of electric power required from the in-vehicle devices 51, 52, 53, 54 exceeds the available amount of electric power of the first DC-DC converter 30. In this case, a discharge occurs from the second battery 20 to the in-vehicle devices 51, 52, 53, 54 and, as a result, the terminal voltage of the second battery 20, that is, the system voltage V, decreases below the target voltage Vtgt (V<Vtgt). Therefore, the DDC control apparatus 60 is able to determine whether control over the output voltage with the first DC-DC converter 30 has reached a limit based on the difference between the first instruction value and the terminal voltage acquired from the second battery 20. When control over the output voltage with the first DC-DC converter 30 has reached a limit (Yes in step S204), the process proceeds to step S206; otherwise (No in step S204), the process proceeds to step S205.

In step S205, the DDC control apparatus 60 controls the first DC-DC converter 30 by providing the first instruction value for setting the controlled target value of the output voltage to the target voltage Vtgt. On the other hand, the DDC control apparatus 60 controls the second DC-DC converter 40 by providing the second instruction value for setting the controlled target value of the output voltage to a low voltage lower than the target voltage Vtgt. The low voltage may be a voltage that the output voltage of the second DC-DC converter 40 is constantly lower than the output voltage of the first DC-DC converter 30 and no electric power is supplied from the second DC-DC converter 40. With this control, the system voltage V is controlled to the target voltage Vtgt (V=Vtgt) by the first DC-DC converter 30, and an electric power is supplied from only the first DC-DC converter 30 to the in-vehicle devices 51, 52, 53, 54. After that, the process proceeds to step S202.

In step S206, the DDC control apparatus 60 sets the predetermined flag to "0".

In step S207, the DDC control apparatus 60 sets the predetermined flag to "1".

In step S208, the DDC control apparatus 60 controls the first DC-DC converter 30 by providing the first instruction value for setting the controlled target value of the output voltage to the target voltage Vtgt, and controls the second DC-DC converter 40 by providing the second instruction value for setting the controlled target value of the output voltage to the target voltage Vtgt. In other words. the DDC control apparatus 60 controls the first DC-DC converter 30 and the second DC-DC converter 40 such that the same target voltage Vtgt is output. With this control. the system voltage V is controlled to the target voltage Vtgt (V=Vtgt) with the first DC-DC converter 30 and the second DC-DC converter 40, and available electric powers are respectively output from the first DC-DC converter 30 and the second DC-DC converter 40 to the in-vehicle devices 51, 52, 53, 54 based on an electric power demand. After that, the process proceeds to step S202.

In the DDC control, when at least one of the devices A is in operation, regardless of the magnitude of electric power demand (required total amount of electric power) occurring in the in-vehicle devices 51, 52, 53, 54, both the first DC-DC converter 30 and the second DC-DC converter 40 are constantly kept operable (step S202→step S207→step S208→step S202→step S207→step S208→ . . . ). With this control, when an excess of electric power demand over the supply capacity of the first DC-DC converter 30 occurs, the second DC-DC converter 40 is able to start to supply an electric power immediately without a time lag to start up. Thus, when at least one of the devices A is in operation, the occurrence of a temporary drop of the system voltage V is reduced.

In the DDC control, when any of the devices A is not in operation, only the first DC-DC converter 30 or both the first DC-DC converter 30 and the second DC-DC converter 40 are operated depending on the magnitude of electric power demand (required total amount of electric power) occurring in the in-vehicle devices 51, 52, 53, 54. Specifically, when an electric power that satisfies an electric power demand occurring in the in-vehicle devices 51, 52, 53, 54 is provided by only the first DC-DC converter 30, the second DC-DC converter 40 is not used (step S202→step S203→step S204→step S205→step S202→step S203→step S204→step S205→ . . . ). The second DC-DC converter 40 is also used when an excess of electric power demand over the supply capacity of the first DC-DC converter 30 occurs (step S202→step S203→step S204→step S206→step S208). With this control, when any of the devices A is not in operation, the second DC-DC converter 40 can be operated only when necessary.

Furthermore, in the DDC control, after a transition from a state where at least one of the devices A is in operation to a state where any of the devices A is not in operation, depending on the magnitude of an electric power demand (required total amount of electric power), an electric power that satisfies an electric power demand occurring in the in-vehicle devices 51, 52, 53, 54 at that time may not be provided by only the first DC-DC converter 30 when the operation of the second DC-DC converter 40 is stopped immediately. Thus, the transition state is determined by using the flag and, immediately after the transition, the operation of the second DC-DC converter 40 is continued (step S202→step S203→step S206→step S208). After that, when it is determined that an electric power that satisfies the electric power demand is provided by only the first DC-DC converter 30, the operation of the second DC-DC converter 40 is stopped (step S202→step S203→step S204→step S205). In other words, even when it is determined that the device A that has been operating in step S202 is not in operation, during a processing period until the determination of step S204 is made through step S203→step S206→step→S208 step S202→step S203, the second DC-DC converter 40 is operated regardless of the magnitude of electric power demand occurring in the in-vehicle devices 51, 52, 53, 54. With this control, a stop of supply of electric power to the in-vehicle devices 51, 52, 53, 54 is avoided.

Operation and Advantageous Effects

As described above, the DDC control apparatus 60 according to the embodiment of the disclosure is configured to, when at least one of the in-vehicle devices (devices A) that are susceptible to a temporary drop of the system voltage V is in operation in the power supply system 1 in which the first DC-DC converter 30 and the second DC-DC converter 40 are connected in parallel with each other, constantly keep both the first DC-DC converter 30 and the second DC-DC converter 40 operable.

With this control, when an excess of electric power demand over the supply capacity of the first DC-DC converter 30 occurs, a time lag that is taken until the second DC-DC converter 40 starts up and actually starts outputting an electric power is reduced as compared to when the first DC-DC converter 30 and the second DC-DC converter 40 are sequentially operated depending on the amount of electric power demand. Thus, the occurrence of a temporary drop of the system voltage V, which affects the operation of the devices A, is reduced.

The embodiment of the disclosure is described above. The disclosure may be regarded as a control method that the DC-DC converter control apparatus and the DC-DC converters execute, a control program for executing the control method, a non-transitory computer-readable recording medium storing the control program, or a vehicle in which the DC-DC converter control apparatus and the DC-DC converters are installed.

The DC-DC converter control apparatus according to embodiments of the disclosure is usable when installed in a hybrid vehicle (HV), an electric vehicle (EV), or the like.

What is claimed is:

1. A DC-DC converter control apparatus installed in a vehicle, the vehicle including a first DC-DC converter, a second DC-DC converter connected in parallel with the first DC-DC converter, and a plurality of in-vehicle devices configured to operate on an electric power that is output from at least one of the first DC-DC converter and the second DC-DC converter, the DC-DC converter control apparatus being configured to control the first DC-DC converter and the second DC-DC converter, the DC-DC converter control apparatus comprising a processor programmed to:
monitor whether at least one predetermined device is in operation or not, where the at least one predetermined device is included in the plurality of in-vehicle devices;
when the at least one predetermined device is not in operation, set at least a controlled target value of an output voltage of the first DC-DC converter to a target voltage for operating the plurality of in-vehicle devices; and
when at least one of the at least one predetermined device is in operation, set the controlled target value of the output voltage of the first DC-DC converter and a controlled target value of an output voltage of the second DC-DC converter to the target voltage.

2. The DC-DC converter control apparatus according to claim 1, wherein:
the processor is programmed to, when the at least one predetermined device is not in operation,
when a total amount of electric power required from the plurality of in-vehicle devices is less than or equal to an available amount of electric power of the first DC-DC converter, set the controlled target value of the output voltage of the second DC-DC converter to a voltage lower than the target voltage; and
when the total amount of electric power required from the plurality of in-vehicle devices exceeds the available amount of electric power of the first DC-DC converter, set the controlled target value of the output voltage of the second DC-DC converter to the target voltage.

3. The DC-DC converter control apparatus according to claim 2, wherein the processor is programmed to, when an instruction value for controlling the output voltage of the first DC-DC converter reaches an allowable prescribed upper limit, determine that the total amount of electric power required from the plurality of in-vehicle devices exceeds the available amount of electric power of the first DC-DC converter.

4. The DC-DC converter control apparatus according to claim 1, wherein the processor is programmed to, after a transition from a state where the at least one of the at least one predetermined device is in operation to a state where the at least one predetermined device is not in operation, set the controlled target value of the output voltage of the second DC-DC converter to the target voltage during a predetermined period.

5. The DC-DC converter control apparatus according to claim 1, wherein the target voltage is a reference voltage for operating the plurality of in-vehicle devices normally.

6. The DC-DC converter control apparatus according to claim 1, wherein:
the processor is programmed to output a first instruction value to the first DC-DC converter;
the processor is programmed to set the controlled target value of the output voltage of the first DC-DC converter;
the processor is programmed to output a second instruction value to the second DC-DC converter; and
the processor is programmed to set the controlled target value of the output voltage of the second DC-DC converter.

7. The DC-DC converter control apparatus according to claim 1, wherein the at least one predetermined device is an illuminating device or a wiper device.

8. A DC-DC converter control method for a vehicle, the vehicle including a first DC-DC converter, a second DC-DC converter connected in parallel with the first DC-DC converter; and a plurality of in-vehicle devices configured to operate on an electric power that is output from at least one of the first DC-DC converter and the second DC-DC converter, the DC-DC converter control method comprising:
monitoring whether at least one predetermined device is in operation or not, where the at least one predetermined device is included in the plurality of in-vehicle devices;
determining whether the at least one predetermined device is in operation;
when it is determined that the at least one predetermined device is not in operation, setting at least a controlled target value of an output voltage of the first DC-DC converter to a target voltage for operating the plurality of in-vehicle devices; and
when it is determined that at least one of the at least one predetermined device is in operation, setting the controlled target value of the output voltage of the first DC-DC converter and a controlled target value of an output voltage of the second DC-DC converter to the target voltage.

9. The method according to claim 8, further comprising:
when it is determined that the at least one predetermined device is not in operation,
determining whether a total amount of electric power required from the plurality of in-vehicle devices is less than or equal to an available amount of electric power of the first DC-DC converter;
when it is determined that the total amount of electric power required from the plurality of in-vehicle devices is less than or equal to the available amount of electric power of the first DC-DC converter, setting the controlled target value of the output voltage of the second DC-DC converter to a voltage lower than the target voltage; and
when it is determined that the total amount of electric power required from the plurality of in-vehicle devices exceeds the available amount of electric power of the first DC-DC converter, setting the controlled target value of the output voltage of the second DC-DC converter to the target voltage.

10. The method according to claim 9, wherein, when an instruction value for controlling the output voltage of the first DC-DC converter reaches an allowable prescribed upper limit, it is determined that the total amount of electric power required from the plurality of in-vehicle devices exceeds the available amount of electric power of the first DC-DC converter.

11. The method according to claim 8, further comprising, after a transition from a state where the at least one of the at least one predetermined device is in operation to a state where the at least one predetermined device is not in operation, setting the controlled target value of the output voltage of the second DC-DC converter to the target voltage during a predetermined period.

* * * * *